US011727952B2

(12) United States Patent
Lipman (10) Patent No.: US 11,727,952 B2
(45) Date of Patent: *Aug. 15, 2023

(54) GLASSES WITH CLOSED CAPTIONING, VOICE RECOGNITION, VOLUME OF SPEECH DETECTION, AND TRANSLATION CAPABILITIES

(71) Applicant: Colquitt Partners, Ltd., Houston, TX (US)

(72) Inventor: Ronald Lipman, Houston, TX (US)

(73) Assignee: COLQUITT PARTNERS, LTD., Houston, TX (US)

( * ) Notice: Subject to any disclaimer, the term of this patent is extended or adjusted under 35 U.S.C. 154(b) by 206 days.

This patent is subject to a terminal disclaimer.

(21) Appl. No.: 17/349,549

(22) Filed: Jun. 16, 2021

(65) Prior Publication Data
US 2021/0312940 A1 Oct. 7, 2021

Related U.S. Application Data

(63) Continuation of application No. 16/704,256, filed on Dec. 5, 2019, now Pat. No. 11,069,368.
(Continued)

(51) Int. Cl.
*G10L 21/14* (2013.01)
*G06F 40/58* (2020.01)
(Continued)

(52) U.S. Cl.
CPC ............. *G10L 21/14* (2013.01); *G02C 11/10* (2013.01); *G06F 3/011* (2013.01); *G06F 40/58* (2020.01);
(Continued)

(58) Field of Classification Search
CPC .. G01H 3/12; G01S 3/802; G01S 3/86; G02B 27/017; G02B 27/01712; G02B 27/0176;
(Continued)

(56) References Cited

U.S. PATENT DOCUMENTS 6,629,076 B1 * 9/2003 Haken ...................... G01H 3/12
704/271
8,553,910 B1 * 10/2013 Dong ..................... H04R 1/028
351/158

(Continued)

*Primary Examiner* — Gerald Gauthier
(74) *Attorney, Agent, or Firm* — Ewing & Jones, PLLC (57) ABSTRACT

The glasses with display may include a bridge, two temples hingedly coupled to the bridge, and a directional microphone array, the directional microphone array including two or more microphones positioned on the bridge or the temples. The glasses with display may also include a user microphone array, the user microphone array including one or more microphones positioned on the temples and oriented toward the mouth of a user wearing the glasses with display or one or more bone conduction microphones. In addition, the glasses with display include two lenses positioned in the bridge, at least one of the lenses including a display, the display visible by the user, the display including one or more of a directional display, closed caption display, and user volume display. The glasses with display additionally include a processor adapted to receive audio signals from the directional microphone array and the user microphone array, or from a separate mobile device, the processor adapted to control the display.

9 Claims, 8 Drawing Sheets

Related U.S. Application Data (60) Provisional application No. 62/781,374, filed on Dec. 18, 2018.

(51) Int. Cl.

| | | |
|---|---|---|
| *H04R 1/40* | (2006.01) | |
| *H04R 3/00* | (2006.01) | |
| *H04R 1/02* | (2006.01) | |
| *G06F 3/01* | (2006.01) | |
| *G10L 15/22* | (2006.01) | |
| *G02C 11/00* | (2006.01) | |
| *G10L 15/26* | (2006.01) | |
| *G10L 21/06* | (2013.01) | |

(52) U.S. Cl.
CPC ............. *G10L 15/22* (2013.01); *G10L 15/26* (2013.01); *H04R 1/028* (2013.01); *H04R 1/406* (2013.01); *H04R 3/005* (2013.01); *G10L 2021/065* (2013.01); *H04R 2499/15* (2013.01)

(58) Field of Classification Search
CPC ...... G02B 2027/014; G02B 2027/0178; G02B 27/0172; G02C 5/02; G02C 5/146; G02C 5/2209; G02C 11/10; G03B 13/10; G06F 3/011; G06F 3/012; G06F 3/0346; G06F 3/03547; G06F 3/04815; G06F 3/165; G06F 3/167; G06F 40/58; G06F 3/013; G06F 3/14; G10L 15/22; G10L 15/25; G10L 15/26; G10L 17/00; G10L 21/14; G10L 25/51; G10L 2021/065; H04M 1/05; H04N 21/4438; H04R 1/028; H04R 1/10; H04R 1/1066; H04R 1/406; H04R 3/005; H04R 25/65; H04R 2499/15; A61B 3/112

See application file for complete search history.

(56) References Cited

U.S. PATENT DOCUMENTS

| | | | |
|---|---|---|---|
| 9,380,374 B2* | 6/2016 | Sprague | H04R 25/65 |
| 9,621,795 B1* | 4/2017 | Whyte | H04R 1/406 |
| 9,720,260 B2* | 8/2017 | Calilung | G02C 5/02 |
| 9,835,878 B2* | 12/2017 | Lee | G06F 3/03547 |
| 10,490,101 B2* | 11/2019 | Teshima | G10L 15/26 |
| 10,598,959 B1* | 3/2020 | Yang | G02C 11/10 |
| 10,878,819 B1* | 12/2020 | Chavez | G10L 15/25 |
| 11,069,368 B2* | 7/2021 | Lipman | G02C 11/10 |
| 11,304,023 B1* | 4/2022 | Tran | G10L 15/26 |
| 2003/0184868 A1* | 10/2003 | Geist | G02B 27/0176 351/63 |
| 2004/0156114 A1* | 8/2004 | Sayed | G02B 27/0172 359/630 |
| 2011/0273662 A1* | 11/2011 | Hwang | G02B 27/0176 351/158 |
| 2012/0078628 A1* | 3/2012 | Ghulman | G06F 3/14 704/235 |
| 2013/0235331 A1* | 9/2013 | Heinrich | G02C 11/10 351/158 |
| 2014/0081634 A1* | 3/2014 | Forutanpour | G06F 40/58 704/235 |
| 2014/0236594 A1* | 8/2014 | Clarke | G02B 27/017 704/235 |
| 2014/0253866 A1* | 9/2014 | Carabajal | G02B 27/017 351/123 |
| 2015/0149170 A1* | 5/2015 | Zhong | G02B 27/017 704/235 |
| 2015/0277552 A1* | 10/2015 | Wilairat | G06F 3/013 386/244 |
| 2015/0319546 A1* | 11/2015 | Sprague | H04R 1/1066 381/312 |
| 2016/0291348 A1* | 10/2016 | Chen | G02C 11/10 |
| 2017/0108714 A1* | 4/2017 | Kuczewski | G02C 5/146 |
| 2017/0243600 A1* | 8/2017 | Teshima | G10L 25/51 |
| 2017/0303052 A1* | 10/2017 | Kakareka | G01S 3/86 |
| 2017/0363885 A1* | 12/2017 | Blum | G03B 13/10 |
| 2018/0206028 A1* | 7/2018 | Conliffe | H04R 1/10 |
| 2018/0246335 A1* | 8/2018 | Ushakov | H04M 1/05 |
| 2019/0278555 A1* | 9/2019 | Carvajal | G06F 3/165 |
| 2020/0143774 A1* | 5/2020 | Kohara | G06F 3/04815 |
| 2020/0194028 A1* | 6/2020 | Lipman | H04R 1/028 |
| 2021/0312940 A1* | 10/2021 | Lipman | G06F 3/0346 |
| 2021/0344991 A1* | 11/2021 | Todd | H04N 21/4438 |
| 2022/0011604 A1* | 1/2022 | Blum | G02C 5/2209 |
| 2022/0308366 A1* | 9/2022 | Hart | A61B 3/112 |

* cited by examiner

GLASSES WITH CLOSED CAPTIONING, VOICE RECOGNITION, VOLUME OF SPEECH DETECTION, AND TRANSLATION CAPABILITIES

CROSS REFERENCE TO RELATED APPLICATIONS

This application is a continuation application which claims priority from U.S. utility application Ser. No. 16/704,256, filed Dec. 5, 2019, which is itself a nonprovisional application which claims priority from U.S. provisional application No. 62/781,374, filed Dec. 18, 2018.

TECHNICAL FIELD/FIELD OF THE DISCLOSURE

The present disclosure relates to personal wearable electronic devices, and specifically to eyeglasses.

BACKGROUND OF THE DISCLOSURE

People with profound or total hearing loss are unable to converse easily with others. They often are unable to hear some or all of the words that are spoken to them, or the words they do hear are misunderstood. The inability to communicate well can occur in many different settings, including, but not limited to, one-on-one meetings, group meetings and phone calls. In addition, people with profound or total hearing loss are unable to hear spoken words in places of worship, movie theaters, live theaters, and other group settings where one or several persons are speaking to a larger group of observers.

People with profound hearing loss are often unable to hear their own voices unless they speak very loudly. Other people with total hearing loss are unable to hear how loudly they are speaking. Often, without knowing how loudly they are speaking, these persons speak at volumes that are much louder than necessary in a particular setting.

Some persons who are affected by profound or total hearing loss are proficient at lip reading, and many others are unable to develop the ability to lip read.

People, regardless of their ability to hear well, are also often faced with the task of communicating with others even though neither speaks the other's language. Such encounters may occur in business, travel, and diplomacy, to name a few such instances.

SUMMARY

Eyeglasses with display are disclosed. The glasses with display may include a bridge, two temples hingedly coupled to the bridge, and a directional microphone array, the directional microphone array including two or more microphones positioned on the bridge or the temples. The glasses with display may also include a user microphone array, the user microphone array including one or more microphones positioned on the temples and oriented toward the mouth of a user wearing the glasses with display or one or more bone conduction microphones. In addition, the glasses with display include two lenses positioned in the bridge, at least one of the lenses including a display, the display visible by the user, the display including one or more of a directional display, closed caption display, and user volume display. The glasses with display additionally include a processor adapted to receive audio signals from the directional microphone array and the user microphone array, or from a separate mobile device, the processor adapted to control the display.

A method is disclosed. The method includes providing glasses with display. The glasses with display include a bridge and two temples hingedly coupled to the bridge. The glasses with display further include a directional microphone array, the directional microphone array including two or more microphones positioned on the bridge or the temples and two lenses positioned in the bridge, at least one of the lenses including a display, the display visible by the user. In addition, the glasses with display include a processor. The method also includes receiving sound from a speaker with the directional microphone array as an audio signal and recognizing speech from the audio signal with the processor. The method further includes outputting text speech output from the processor and displaying the text speech output with the display.

A method is disclosed. The method includes providing glasses with display. The glasses with display include a bridge, two temples hingedly coupled to the bridge, and a user microphone array, the user microphone array including one or more microphones positioned on the temples and oriented toward the mouth of a user wearing the glasses with display, or one or more bone conduction microphones. The glasses with display also include two lenses positioned in the bridge, at least one of the lenses including a display, the display visible by the user and a processor. The method also includes receiving sound with the user microphone array, the sound corresponding to the sound of the user's voice, the sound output as an audio signal. In addition, the method includes analyzing the volume of the audio signal with the processor, outputting user volume information from the processor, and displaying the user volume information with the display.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 1:
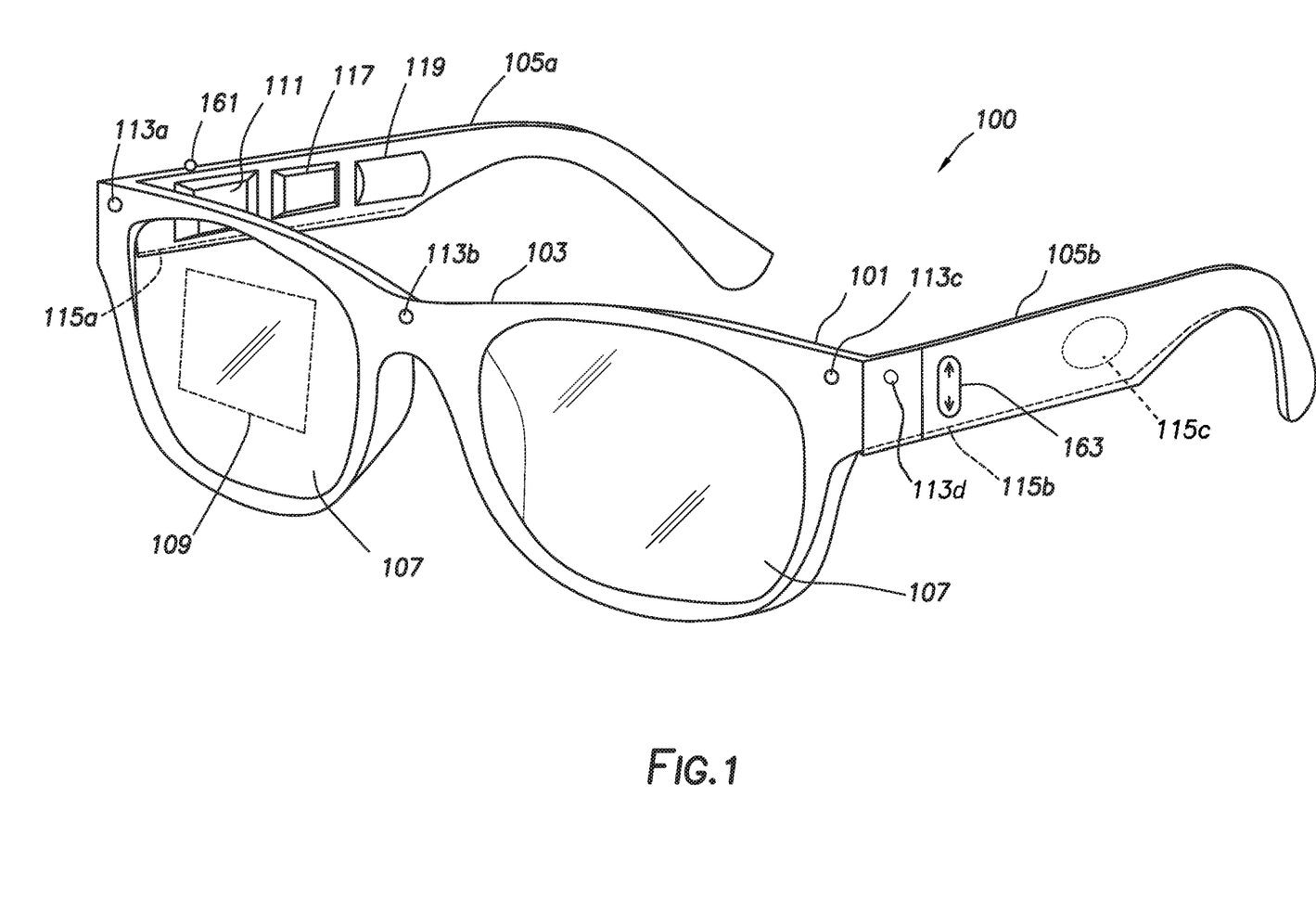
FIG. 1 depicts a perspective view of glasses with display consistent with at least one embodiment of the present disclosure.

FIG. 1 depicts glasses with display 100. Glasses with display 100 may include frame 101. Frame 101 may include bridge 103; arms or temples 105a, 105b; and lenses 107. Temples 105a, 105b may be hingedly coupled to bridge 103. Lenses 107 may be positioned within openings formed in bridge 103. Lenses 107 may be prescription lenses, nonprescription lenses, tinted lenses, or may be formed from flat glass or other material.

One or both of lenses 107 may include display 109 positioned to allow information to be displayed to a wearer of glasses with display 100 as further described below. In some embodiments, display 109 may be generated by one or more micro-LED displays. In some embodiments, display 109 may be generated by projecting an image onto one or both of lenses 107 by, for example and without limitation, projector 111 as shown in FIG. 1. In some embodiments, projector 111 may be positioned in temple 105a. In some embodiments, one or both of lenses 107 may include a filter or other layer or coating that allows display 109 to appear in focus to a user and to make display 109 appear to be further from the user's eye than lens 107. In some embodiments, display 109 may be on one of lenses 107, on both of lenses 107, or on an additional display module within the user's field of view. In some embodiments in which display 109 is on both of lenses 107, display 109 may be generated as a three-dimensional view or hologram. In some embodiments, display 109 may be used to display one or more of a closed caption display and directional display that represent words spoken to a user of glasses with display 100 and a user volume display that indicates the volume of the user's voice as further described below. Display 109 may be used similarly for a phone call.

In some embodiments, glasses with display 100 may include directional microphone array 113 adapted to receive sound from the environment surrounding a user of glasses with display 100 and may be used to determine the direction of the incoming sound. In some embodiments, directional microphone array 113 may include one or more microphones, such as microphones 113a-d depicted in FIG. 1, which may be positioned in bridge 103 (with another microphone positioned on the opposite side). In some embodiments, additional microphones of directional microphone array 113 may be positioned in one or both of temples 105a and 105b.

In some embodiments, glasses with display 100 may include user microphone array 115 which may include one or more user microphones 115a, 115b, 115c. User microphones 115a, 115b, 115c may be positioned to receive sound generated by the user of glasses with display 100, i.e. the user's own voice. In some embodiments, user microphones 115a, 115b may be positioned in a lower side of temples 105a, 105b such that user microphones 115a, 115b point downward toward the user's mouth. In some embodiments, user microphones 115a may be bone conduction microphones. In yet other embodiments, where a user microphone is a bone conduction microphone, the bone conduction microphone may be microphone 115c, for example.

In some embodiments, glasses with display 100 may include processor module 117. Processor module 117 may include a processor as further described below that is used to receive audio signals from directional microphone array 113, user microphone array 115, and any other sensors and to control display 109. In some embodiments, processor module 117 may be positioned in one of temples 105a, 105b. In some embodiments, processor module 117 may be positioned in the same temple (105a as depicted in FIG. 1) as projector 111 or may be in the opposite temple (105b as depicted in FIG. 1). In some embodiments, glasses with display 100 may include power supply 119. Power supply 119 may include, for example and without limitation, one or more batteries. In some embodiments, batteries may be user replaceable or may be rechargeable. In some embodiments, power supply 119 may, for example and without limitation, include one or more lithium-ion, lithium-polymer, nickel-cadmium, nickel metal hydride, or alkaline batteries. In some embodiments, power supply 119 may include a receptacle for recharging the batteries such as, for example and without limitation, a USB jack or other suitable connector. In other embodiments, power supply 119 may include a wireless charging system to connect to an external wireless charging pad.

Figure 2:
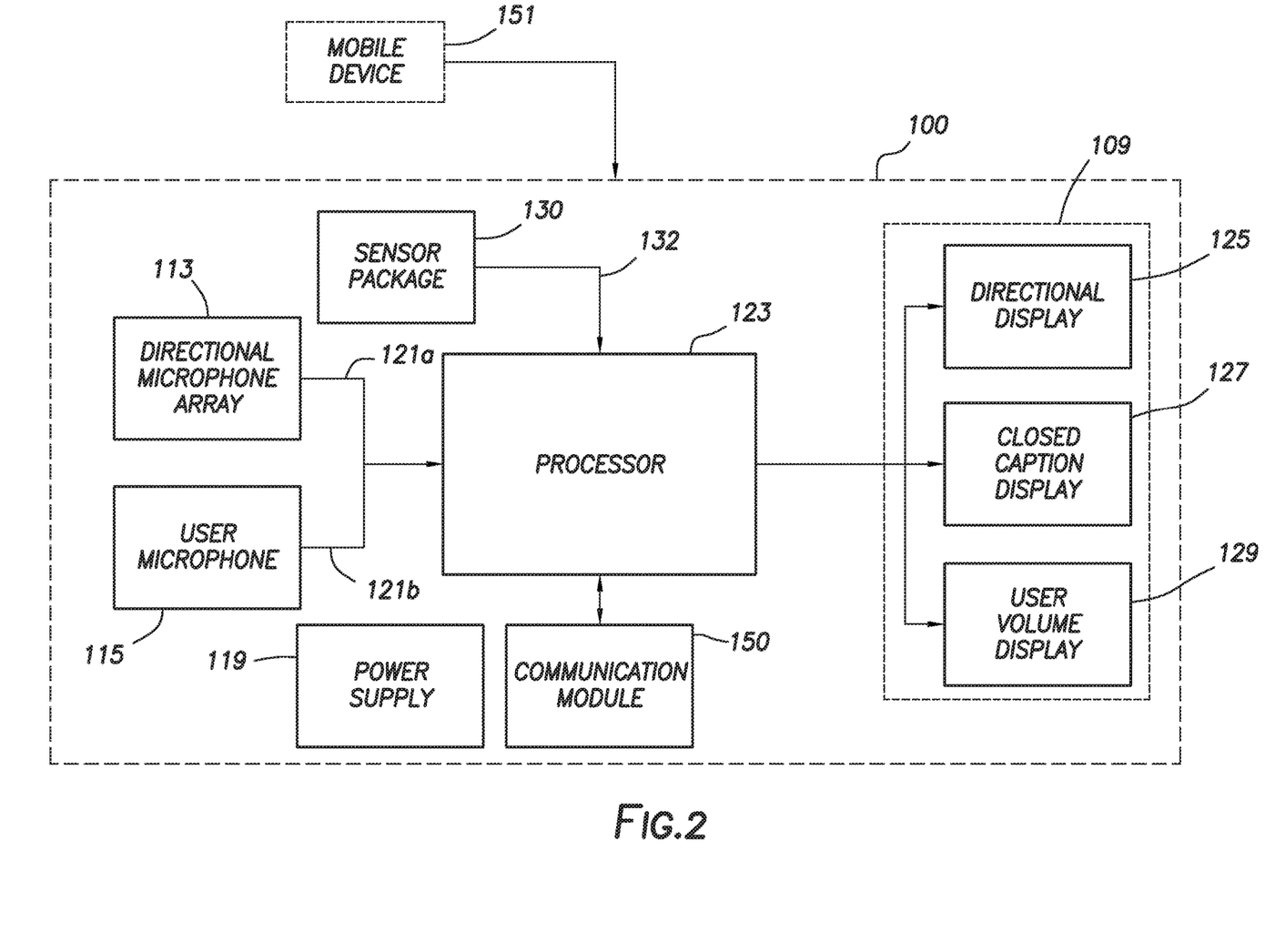
FIG. 2 depicts a schematic diagram of the glasses with display of FIG. 1.

FIG. 2 depicts a representative schematic diagram of glasses with display 100. Directional microphone array 113 and user microphone array 115 may be used to receive sound such as words spoken to a user of glasses with display 100 or spoken by a user of glasses with display 100 and may convert the sound to audio signals 121a, 121b, which may be input to processor 123. Processor 123 may analyze audio signals 121a, 121b as further discussed below, to determine one or more of what words were spoken to a user, the direction of the speaker of the words spoken relative to the user, and the volume of the user's voice. In some embodiments, processor 123 may further translate the words spoken to the user. Processor 123 may be operatively coupled to display 109 such that processor 123 causes display 109 to generate and display one or more of directional display 125, closed caption display 127, and user volume display 129.

In some embodiments, glasses with display 100 may include sensor package 130. Sensor package 130 may include one or more sensors including, for example and without limitation, one or more accelerometers, gyros, and magnetometers positioned to determine the direction that a user of glasses with display 100 is looking and any change in orientation of glasses with display 100. This directional and movement information may be used by processor 123 as further described below.

Figure 3:
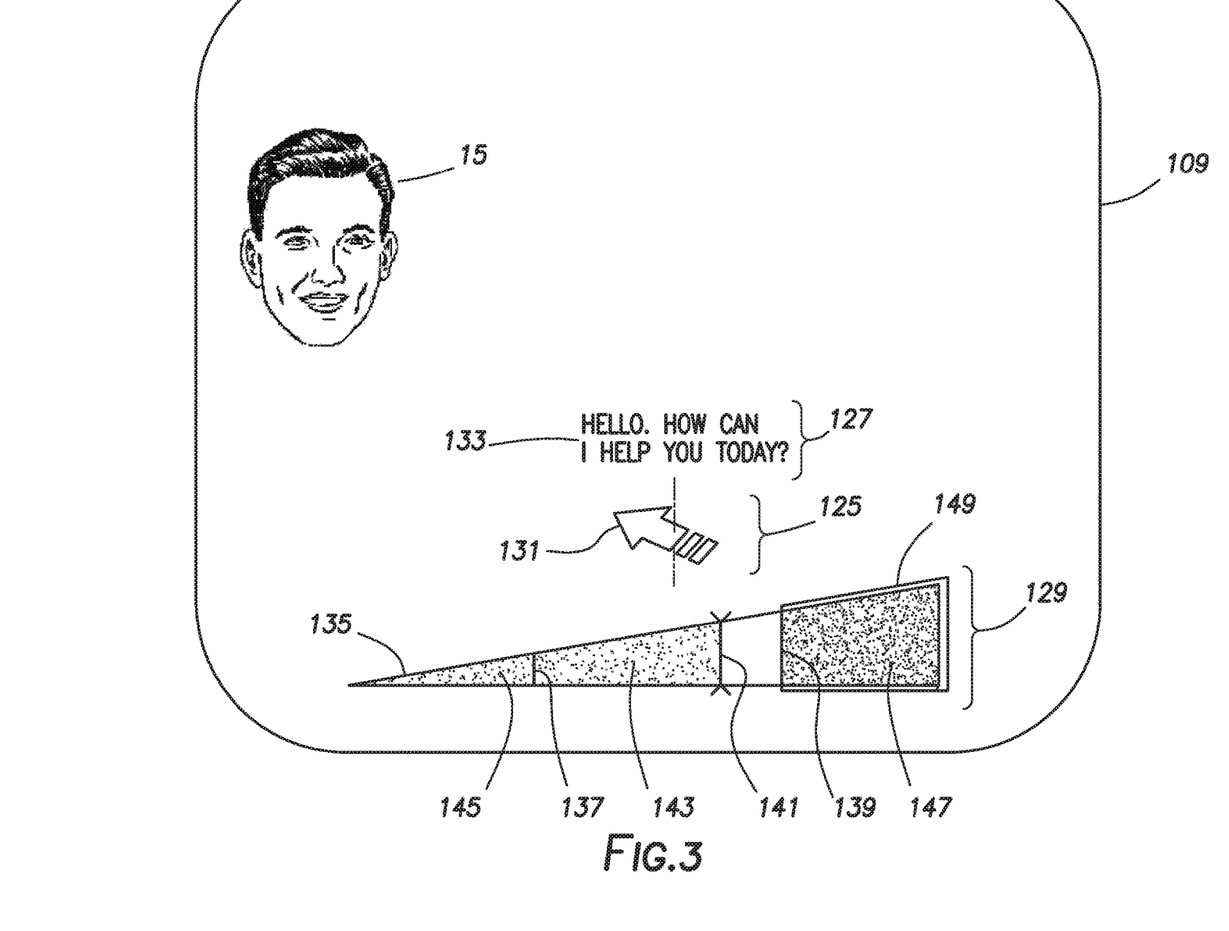
FIG. 3 depicts a representation of the view of a user of glasses with display consistent with at least one embodiment of the present disclosure.
Figure 3A:
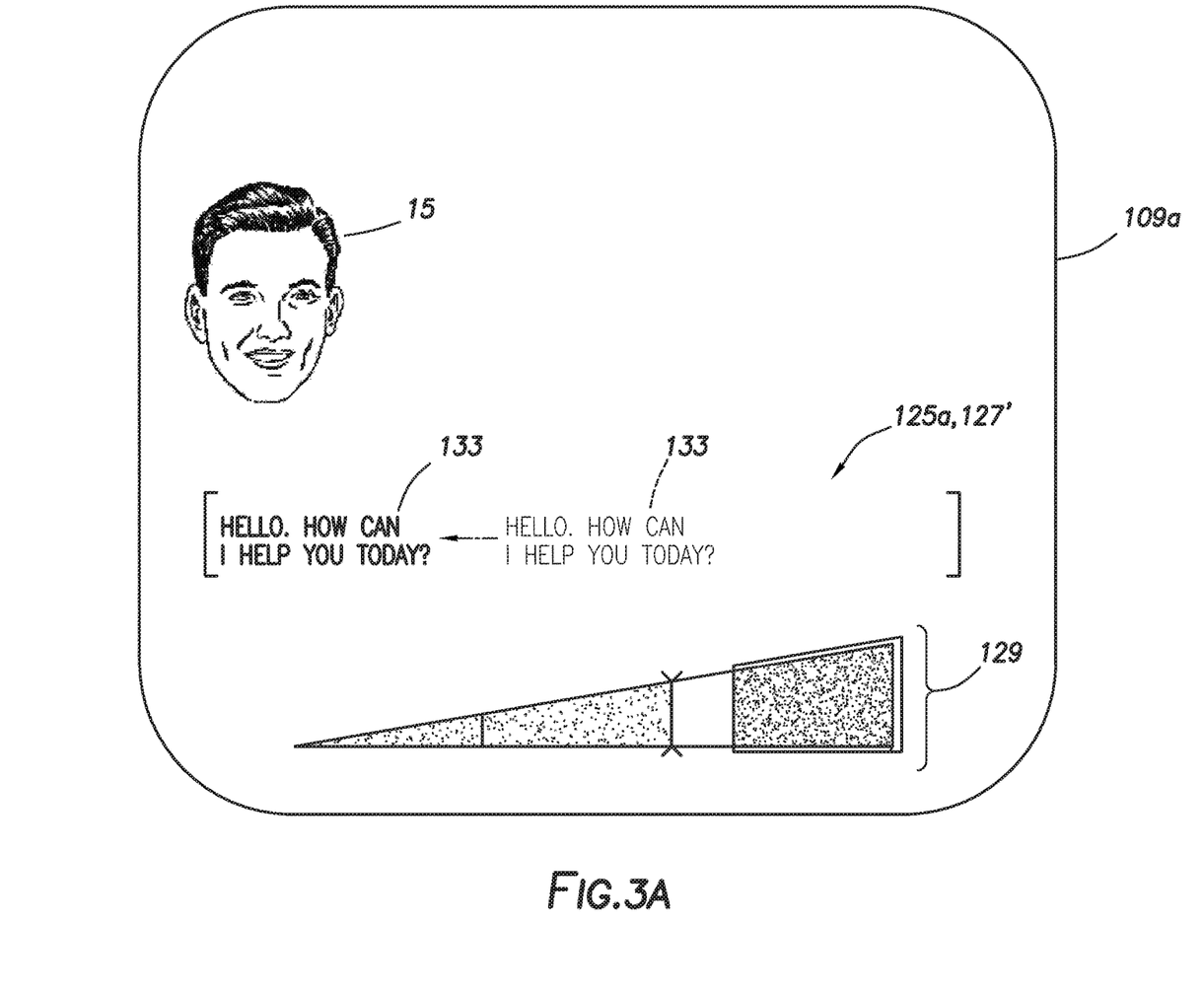
FIG. 3A depicts an alternative representation of the view of a user of glasses with display consistent with at least one embodiment of the present disclosure.

FIGS. 3 and 3A depict examples of display 109, 109a respectively as would be seen by a user of glasses with display 100. These displays are merely examples and are not meant to limit the scope of this disclosure.

Figure 3B:
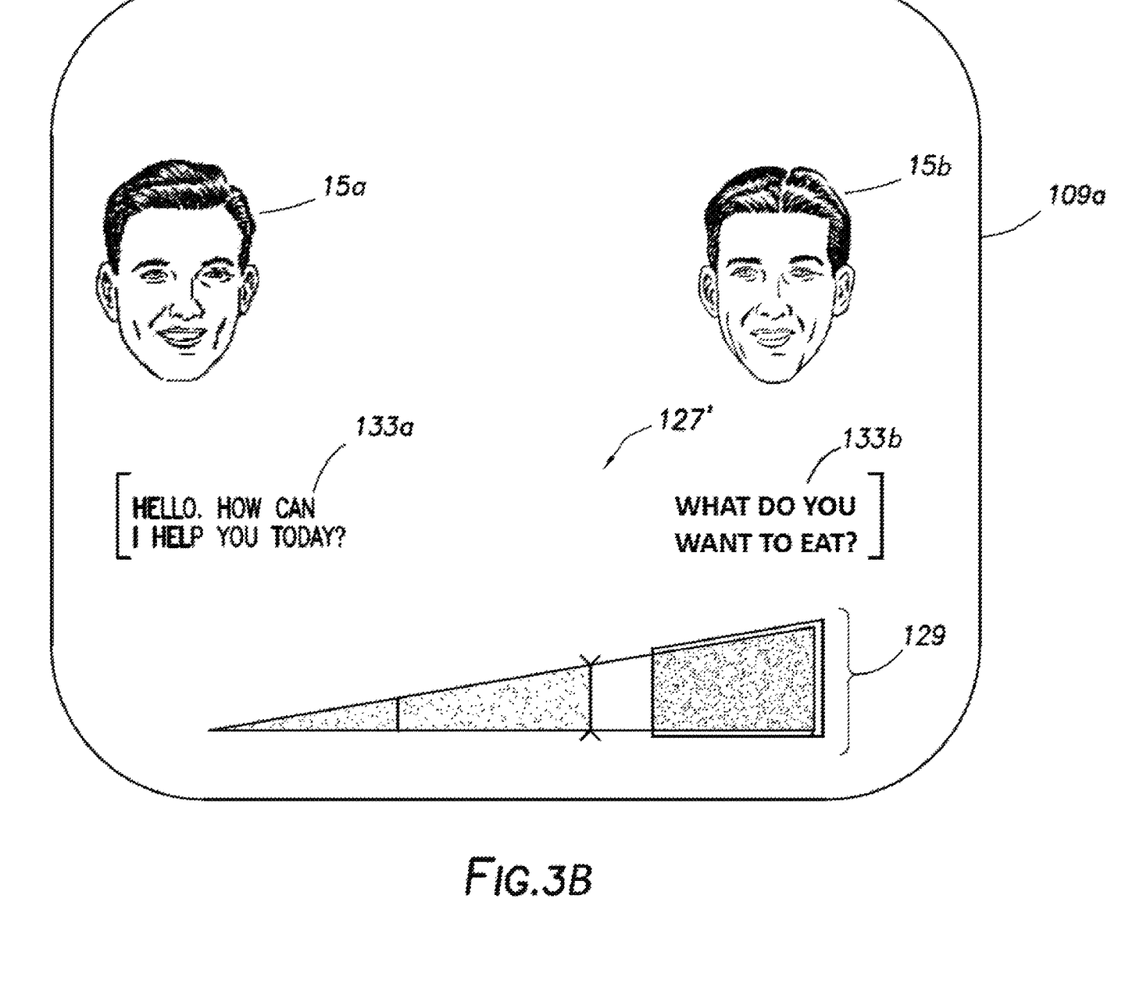
FIG. 3B depicts an alternative representation of the view of a user of glasses with display consistent with at least one embodiment of the present disclosure.

In some embodiments, directional display 125 may indicate the direction relative to the user of glasses with display 100 from which speech is detected. In some embodiments, as shown in FIG. 3, directional display 125 may include one or more visual directional indicators such as arrow 131. In such an embodiment, arrow 131 may appear to rotate to point toward speaker 15 while speaker 15 is speaking to the user. In some embodiments, when a different speaker is speaking to the user, arrow 131 may then point to the different speaker. In other embodiments, as depicted in FIG. 3A, directional display 125a may instead modify the positioning of one or more elements of display 109a such as, for example and without limitation, closed caption display 127' such that closed caption display 127' moves to a position on display 109a to correspond with the relative direction between the current direction of view of the user of glasses with display 100 and speaker 15. In certain embodiments, such as depicted in FIG. 3B, text may appear under or in the direction of the speaker, such that when there are two or more people speaking, such as speakers 15a and 15b, text will appear under each such speaker. on closed caption display 127', shown as text boxes 133a and 133b, respectively. Multiple displays of text may thus appear simultaneously if each other person has spoken.

In some embodiments, glasses with display 100 may include a camera positioned on bridge 103. The camera may, for example and without limitation, be used to determine the direction the user is facing. In some embodiments, the camera may detect and analyze speaker 15. In some embodiments, glasses with display 100 may use information from sensor package 130 and the camera to determine the position of speaker 15 within the user's field of view and may display one or more visual indicators to identify speaker 15 within display 109. For example, in some embodiments, display 109 may indicate speaker 15 within the user's field of view by positioning a box or other shape around the face of speaker 15 from the user's viewpoint. In some embodiments, glasses with display 100 may include one or more sensors positioned to determine the direction to which the eyes of the user are pointing, for example and without limitation, properly position elements of display 109 within the user's field of view.

In some embodiments, closed caption display 127, 127' may be shown as one or more lines of text in text box 133 displayed on display 109, 109a. Text box 133 may display text corresponding to what is said by speaker 15 as further described herein below.

Figure 4:
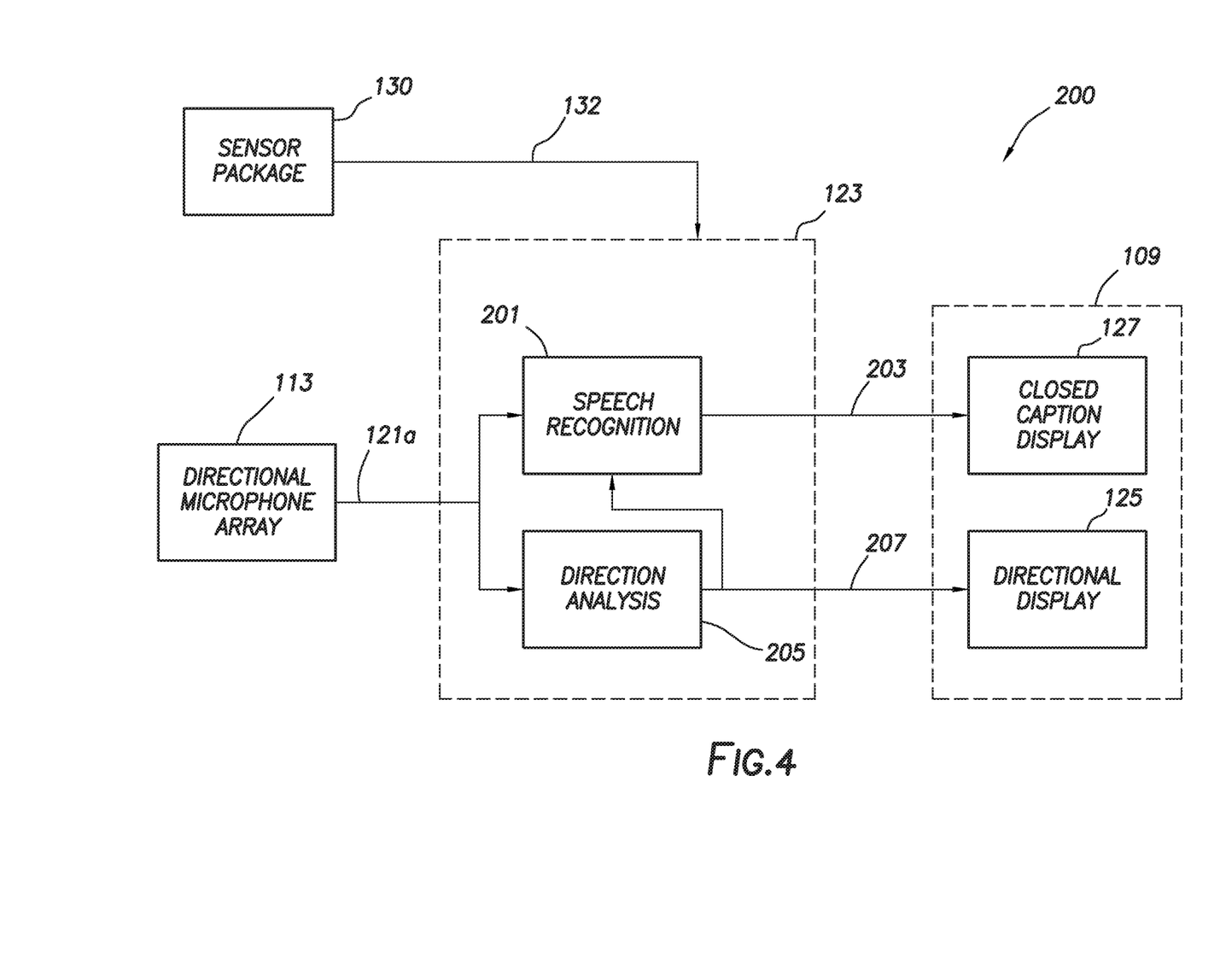
FIG. 4 depicts a schematic diagram of a closed captioning operation consistent with at least one embodiment of the present disclosure.

FIG. 4 depicts a schematic diagram of closed captioning operation 200 consistent with at least one embodiment of the present disclosure. During operation of closed captioning operation 200, processor 123 may receive audio signal 121a from directional microphone array 113. Processor 123 may process audio signal 121a by recognizing speech at speech recognition 201. Speech recognition 201 may analyze audio signal 121a and determine what words were spoken, converting audio signal 121a into text speech output 203. Text speech output 203 may be passed to closed caption display 127 of display 109.

In some embodiments, processor 123 may further process audio signal 121a by determining the direction of the incoming speech at direction analysis 205. Direction analysis 205 may analyze audio signal 121a to determine the direction from which the speech analyzed by speech recognition 201 is received. Direction analysis 205 may use, for example and without limitation, differential analysis of the signals received by each microphone of directional microphone array 113 to determine the direction. Direction analysis 205 may output directional information 207, which may be used by directional display 125 to indicate the direction from which the speech analyzed by speech recognition 201 is received with display 109.

In some embodiments, direction analysis 205 may be used to determine when two or more speakers are detected and to determine which speech is detected from which speaker.

This directional information 207 may be used by speech recognition 201 to refine text speech output 203 to, for example and without limitation, isolate the speech of a single speaker for display, to output multiple text speech outputs 203 for multiple users, or to otherwise affect speech recognition 201.

In some embodiments, the outputs 132 from one or more sensors of sensor package 130 may be used by direction analysis 205 to, for example and without limitation, recognize changes in orientation of glasses with display 100, thereby allowing the directional model to be updated based on the change in orientation of glasses with display 100. Without being bound to theory, the change in orientation of glasses with display 100 may be reflected by updating directional display 125 to indicate that the direction of the source of the speech analyzed by speech recognition 201 relative to the field of view of the user of glasses with display 100 has changed, and updating directional display 125 to correspond with the change in orientation of glasses with display 100.

In some embodiments, speech recognition 201 may further analyze audio signal 121a to determine whether a single speaker or multiple speakers are detected. Speech recognition 201 may use, for example and without limitation, frequency analysis, volume analysis, or other techniques to differentiate the speech of multiple speakers and to determine a primary or selected speaker to analyze. In some embodiments, speech recognition 201 may store the results of this analysis to, for example and without limitation, recognize speakers and, in some embodiments, identify speakers based on past analysis.

In some embodiments, speech recognition 201 may filter out the user's own voice to prevent or reduce the likelihood that the user's own speech is displayed on closed caption display 127. In some such embodiments, speech recognition 201 may use, for example and without limitation, one or more of frequency analysis, volume analysis, or differential analysis between audio signal 121a from directional microphone array 113 and audio signal 121b from user microphone array 115 to differentiate speech from the user and from a speaker. In some embodiments, speech recognition 201 may filter out background noise from audio signal 121a from directional microphone array 113.

Figure 5:
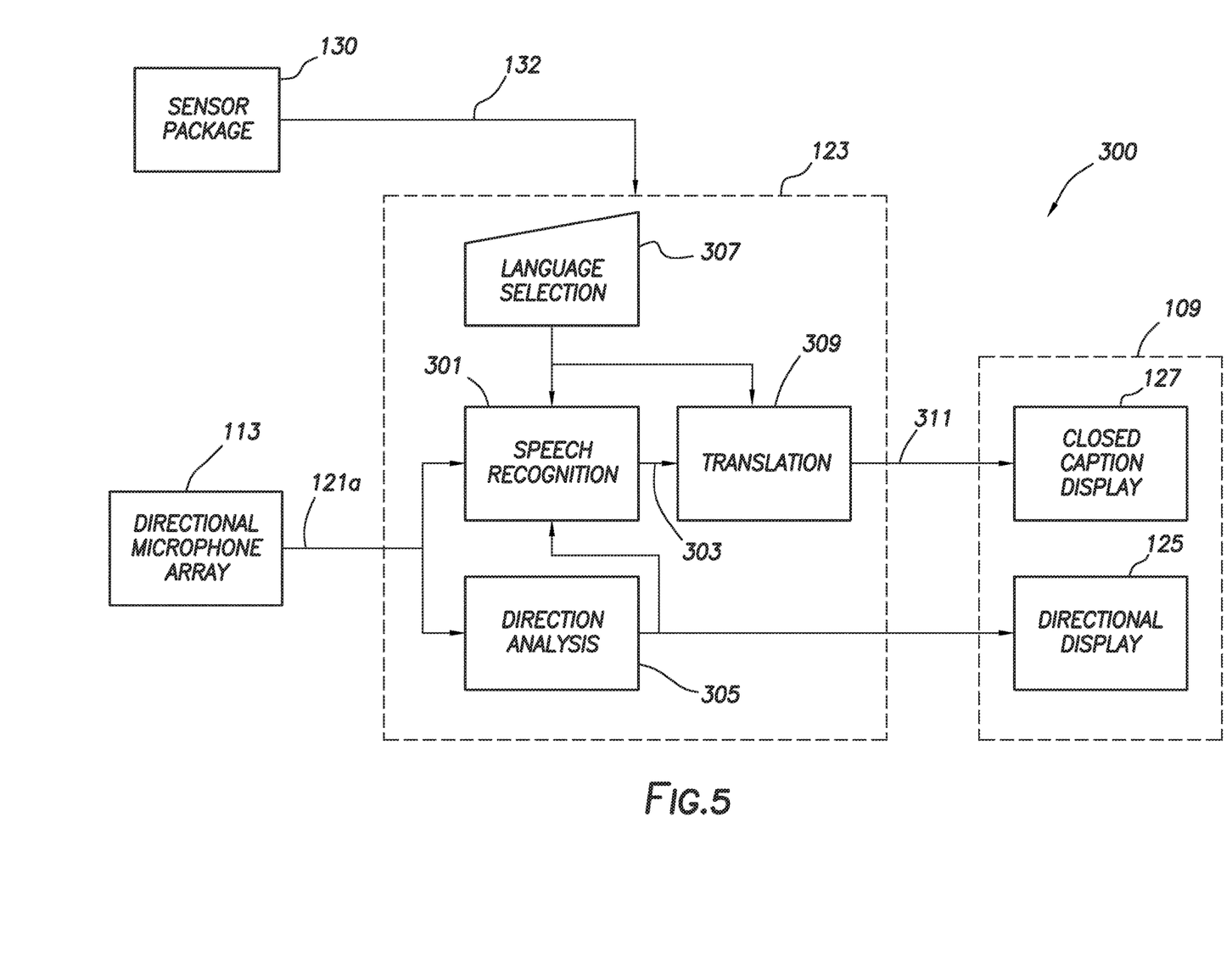
FIG. 5 depicts a schematic diagram of a translation operation consistent with at least one embodiment of the present disclosure.

FIG. 5 depicts a schematic diagram of translation operation 300 consistent with at least one embodiment of the present disclosure. During operation of translation operation 300, processor 123 may receive audio signal 121a from directional microphone array 113. Processor 123 may process audio signal 121a by recognizing speech at speech recognition 301 and may determine the direction of the incoming speech at direction analysis 305 as discussed herein above with respect to closed captioning operation 200. In some embodiments, a user may input a selected language expected to be used by a speaker at language selection 307. The selected language may be input into speech recognition 301 and used, for example, to select a language model to be used by speech recognition 301 when generating text speech output 303. Text speech output 303 may be translated into a language understood by the user at translation 309. Translation 309 may translate text speech output 303 based on the user-selected language at language selection 307 to generate translated text speech output 311. Translated text speech output 311 may be passed to closed caption display 127 of display 109, allowing the user of glasses with display 100 to understand the speech of a speaker speaking a different language by reading the text of closed caption display 127. Thus, multiple speakers of a foreign language could be accommodated, as described hereinabove.

Figure 6:
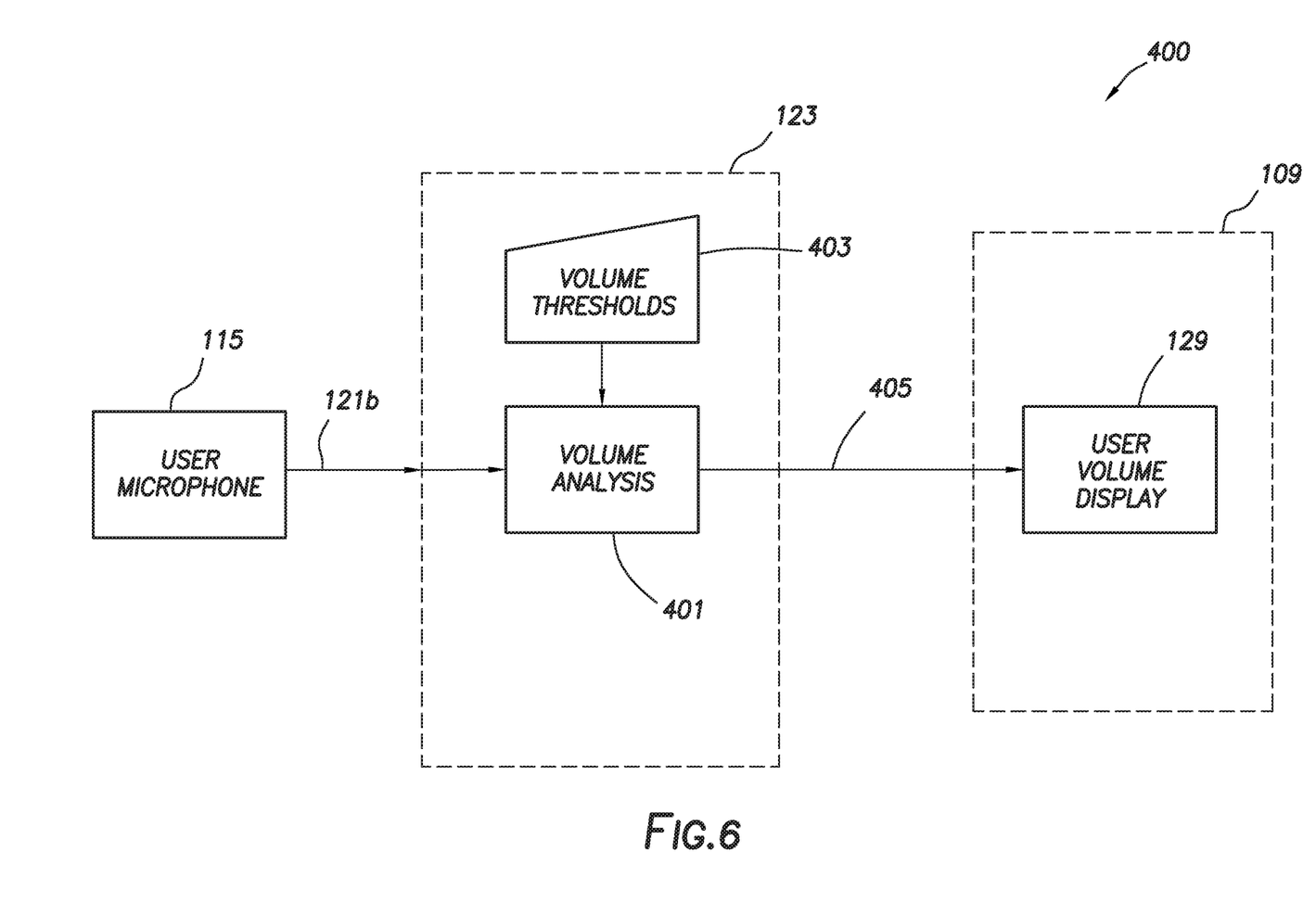
FIG. 6 depicts a schematic diagram of a volume detection operation consistent with at least one embodiment of the present disclosure.

FIG. 6 depicts a schematic diagram of volume detection operation 400. During operation of volume detection operation 400, processor 123 may receive audio signal 121b from user microphone array 115. Processor 123 may process audio signal 121b by determining the volume of the user's voice at volume analysis 401. Volume analysis 401 may compare the amplitude of audio signal 121b to one or more preset volume threshold values, which may be preset or set by a user at volume thresholds 403. Volume analysis 401 may output user volume information 405 corresponding to the volume of the user's voice compared to the preset volume threshold values, the ambient noise level of the current surroundings, or other scale. Volume information 405 may be passed to user volume display 129 to indicate to a user of glasses with display 100 the volume of the user's voice with display 109. In some embodiments, user volume display 129 may provide a visual indication of the volume of the user's voice to the user who may be otherwise unable to assess the volume due to, for example and without limitation, hearing impairment.

In some embodiments, volume analysis 401 may process audio signal 121b to ensure that only the user's voice is used to determine user volume information 405. For example, in some embodiments, audio signal 121a from directional microphone array 113 may be used to identify sounds in the environment other than the user's voice in order to distinguish the user's voice for volume analysis 401.

In some embodiments, as depicted in FIG. 3, volume display 129 may include volume graph 135. Volume graph 135 may visually display the volume of a user's voice while the user is speaking. In some embodiments, volume graph 135 may include visual indicators of volume thresholds including, for example and without limitation, low-volume threshold 137 and high-volume threshold 139. Volume graph 135 may include indicator 141 to indicate the volume of the user's voice relative to low-volume threshold 137 and high-volume threshold 139 or relative to the scale of volume graph 135. In some embodiments, volume graph 135 may be triangular or rectangular, or it may consist of a series of dashes or other markings, to visually indicate which end of volume graph 135 indicates low-volume and which end indicates high-volume. In some embodiments, sections of volume graph 135 may be color-coded to indicate when the user's voice is within normal volume range 143, low-volume range 145, or high-volume range 147, specified by low-volume threshold 137 and high-volume threshold 139. In some embodiments, for example and without limitation, low-volume range 145 may be indicated by a yellow or white color, normal volume range 143 by a green or gray color, and high-volume range 147 by a red or black color. In some embodiments, high-volume range 147 may include one or more further indicators such as accentuation lines 149 to visually indicate that the user is speaking at a volume above the high-volume threshold 139. In some embodiments, one or more elements of volume graph 135 may otherwise indicate the volume of the user's voice by, for example and without limitation, flashing, changing in color, or otherwise indicating information relevant to the user regarding the volume of the user's voice.

In some embodiments as depicted in FIG. 2, glasses with display 100 may include communications module 150. Communications module 150 may allow for wired or wireless communication between glasses with display 100 and other, external devices. Communications module 150 may include, for example and without limitation, one or more of a WI-FI transceiver, Bluetooth transceiver, or cellular transceiver. In some embodiments, glasses with display 100 may use communications module 150 to connect to mobile device 151 such as, for example and without limitation, a smartphone. Mobile device 151 may, in some embodiments, be used to configure settings of glasses with display 100 including, for example and without limitation, language selection 307 used for translation operation 300, volume thresholds 403 used for volume detection operation 400. In some embodiments, mobile device 151 may be used to configure parameters of display 109 including, for example and without limitation, display brightness, positioning of elements of display 109, font type, font size, text color, and what elements of display 109 are enabled. In some embodiments, communications module 150 may be used to communicate with one or more external devices such as headphones, which may be used to output audible signals to a user including, for example and without limitation, translations of analyzed speech. In certain embodiments, communications module 150 may be used to make and receive phone calls.

Where glasses with display 100 are used to receive incoming phone calls or function with communications module 150 to make outgoing phone calls, glasses with display 100 may, for example and without limitation, display an alert that a call is being received. Such an alert may include text, an icon, the phone number associated with the incoming call, or the name of the party associated with the incoming call. Glasses with display 100 may display text of the spoken words of the person on the incoming call as described above with respect to other speakers. In some embodiments, glasses with display 100 may conduct the incoming or outgoing phone call by using user microphone array 115.

In some embodiments, one or more functions or parameters of glasses with display 100 may be set by voice control. In such an embodiment, processor 123 may use audio signals 121b from user microphone array 115 and speech recognition as described above with respect to closed captioning operation to identify commands spoken by a user and to update operating modes and parameters of glasses with display 100 based on the received speech.

In some embodiments, as depicted in FIG. 1, glasses with display 100 may include one or more external controls including, for example and without limitation, on/off switch 161 and brightness switch 163. On/off switch 161 may allow a user to enable or disable display 109 of glasses with display 100 and to control other functions while glasses with display 100 are in use. On/off switch 161 may also be used to answer an incoming phone call, make an outgoing phone call, or terminate a call. In other embodiments, glasses with display 100 may be turned off by removing the glasses from the user's head and closing one or both arms or temples 105a, 105b. Brightness switch 163 may be used to change the brightness of display 109.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A method comprising:
   providing glasses with display, the glasses with display including:
   a bridge;
   two temples hingedly coupled to the bridge;
   a directional microphone array, the directional microphone array including two or more microphones positioned on the bridge or the temples;
   two lenses positioned in the bridge, at least one of the lenses including a display, the display visible by the user; and
   a processor;
   receiving sound from a first speaker with the directional microphone array as an audio signal;
   recognizing speech from the audio signal with the processor;
   determining directional information for a first speech origination position of the first speaker based on differential analysis of the sound received by the two or more microphones in the directional microphone array using the processor;
   outputting text speech output from the processor;
   displaying the text speech output with the display wherein displaying the directional information with the display comprises displaying an arrow in the user's field of vision;
   outputting directional information from the processor; and
   displaying the directional information with the display.

2. The method of claim 1, further comprising rotating the arrow to point toward the first speaker when the first speaker is speaking.

3. The method of claim 2, wherein the method further comprises:
   determining directional information for a second speech origination position of a second speaker based on differential analysis of the sound received by the two or more microphones in the directional microphone array using the processor; and
   rotating the arrow to point toward the second speaker when the second speaker is speaking.

4. The method of claim 3, wherein displaying the directional information with the display comprises displaying the text box in a position within the user's field of vision corresponding with the directional information for a first speaker.

5. The method of claim 4, wherein the text box is displayed under or in the direction of the first speaker when the first speaker is speaking.

6. The method of claim 5, wherein the text box is displayed under or in the direction of the second speaker when the second speaker is speaking.

7. A method comprising:
   providing glasses with display, the glasses with display including:
   a bridge;
   two temples hingedly coupled to the bridge;
   a directional microphone array, the directional microphone array including two or more microphones positioned on the bridge or the temples;
   two lenses positioned in the bridge, at least one of the lenses including a display, the display visible by the user;
   a camera;
   a sensor module, the sensor module including one or more of an accelerometer, magnetometer, and gyro; and
   a processor;
   determining a position in which a user is facing using the camera;
   detecting a speaker using the camera;
   using the camera information from the sensor package to determine the position of the speaker within the user's field of vision; and
   displaying a visual indicator on the display to identify the speaker.

8. The method of claim 7, wherein the visual indicator is a shape around a face of a speaker.

9. The method of claim 7, further comprising:
   determining the direction in which eyes of the user are facing; and
   positioning elements of the display within the field of view of the user.

* * * * *